United States Patent [19]

Riddell

[11] Patent Number: 4,915,549
[45] Date of Patent: Apr. 10, 1990

[54] MULTIPLE BORE DRILLING APPARATUS

[75] Inventor: Charles C. Riddell, Castro Valley, Calif.

[73] Assignee: Michael A. Wilkman, Danville, Calif.; a part interest

[21] Appl. No.: 306,704

[22] Filed: Feb. 6, 1989

[51] Int. Cl.[4] .......................... B23B 39/14; B23B 39/16
[52] U.S. Cl. ........................................ 408/43; 408/46; 408/53; 408/77
[58] Field of Search ...................... 408/31, 42, 43, 46, 408/53, 77, 236, 237, 234

[56] References Cited

U.S. PATENT DOCUMENTS

| | | | |
|---|---|---|---|
| 82,303 | 9/1868 | Fory | 408/77 |
| 1,511,164 | 10/1924 | Hey et al. | |
| 1,977,202 | 10/1934 | Palkowski et al. | 408/46 |
| 2,215,273 | 9/1940 | Paradis | 144/110 |
| 2,357,728 | 9/1944 | DeAnguera | 77/22 |
| 2,701,711 | 2/1965 | Demo | 262/7 |
| 3,189,065 | 6/1965 | Cochrane | 144/112 |
| 3,545,309 | 12/1970 | Calhoun | 408/46 |
| 3,687,563 | 8/1972 | McConnell | 408/50 |
| 3,977,804 | 8/1976 | Kitagawa | 408/16 |
| 4,057,234 | 11/1977 | Brucher et al. | 408/236 |
| 4,090,803 | 5/1978 | Haley | 408/12 |
| 4,162,134 | 7/1979 | Kitagawa | 408/46 |
| 4,586,856 | 5/1986 | Waber | 408/92 |
| 4,674,925 | 6/1987 | Thornton | 408/1 R |

FOREIGN PATENT DOCUMENTS

| | | | |
|---|---|---|---|
| 196104 | 11/1984 | Japan | 408/31 |
| 563266 | 8/1944 | United Kingdom | 408/52 |

Primary Examiner—Daniel Howell
Attorney, Agent, or Firm—Harris Zimmerman

[57] ABSTRACT

Mobile drilling apparatus enables drilling of a plurality of bores in a building wall or the like, concurrently or sequentially or in groups, for the purpose of attaching slabs, panels, siding or other facing material to the wall or for anchoring concrete reinforcement rods to the wall. In the preferred form, the apparatus includes a mobile vehicle having an operator's platform which may be selectively raised or lowered, a vertical drill support frame carried by the platform which may be shifted sidewardly relative to the platform and a plurality of independently driven drills mounted on the support frame by motor driven telescoping structures which travel the drills outward from the frame. The apparatus expedites construction or renovation of buildings by enabling rapid and precise drilling of arrays of bores.

8 Claims, 4 Drawing Sheets

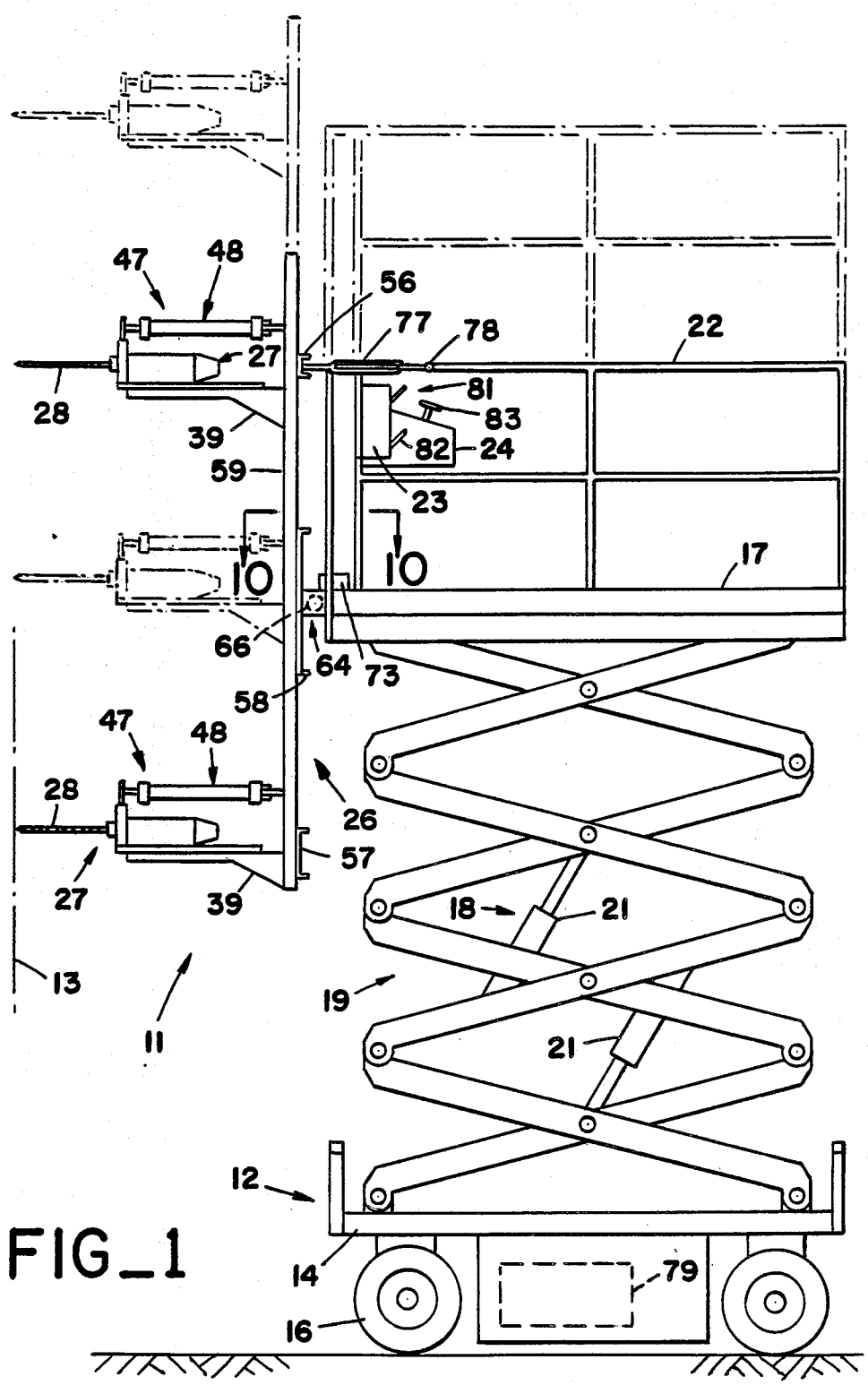
FIG_1

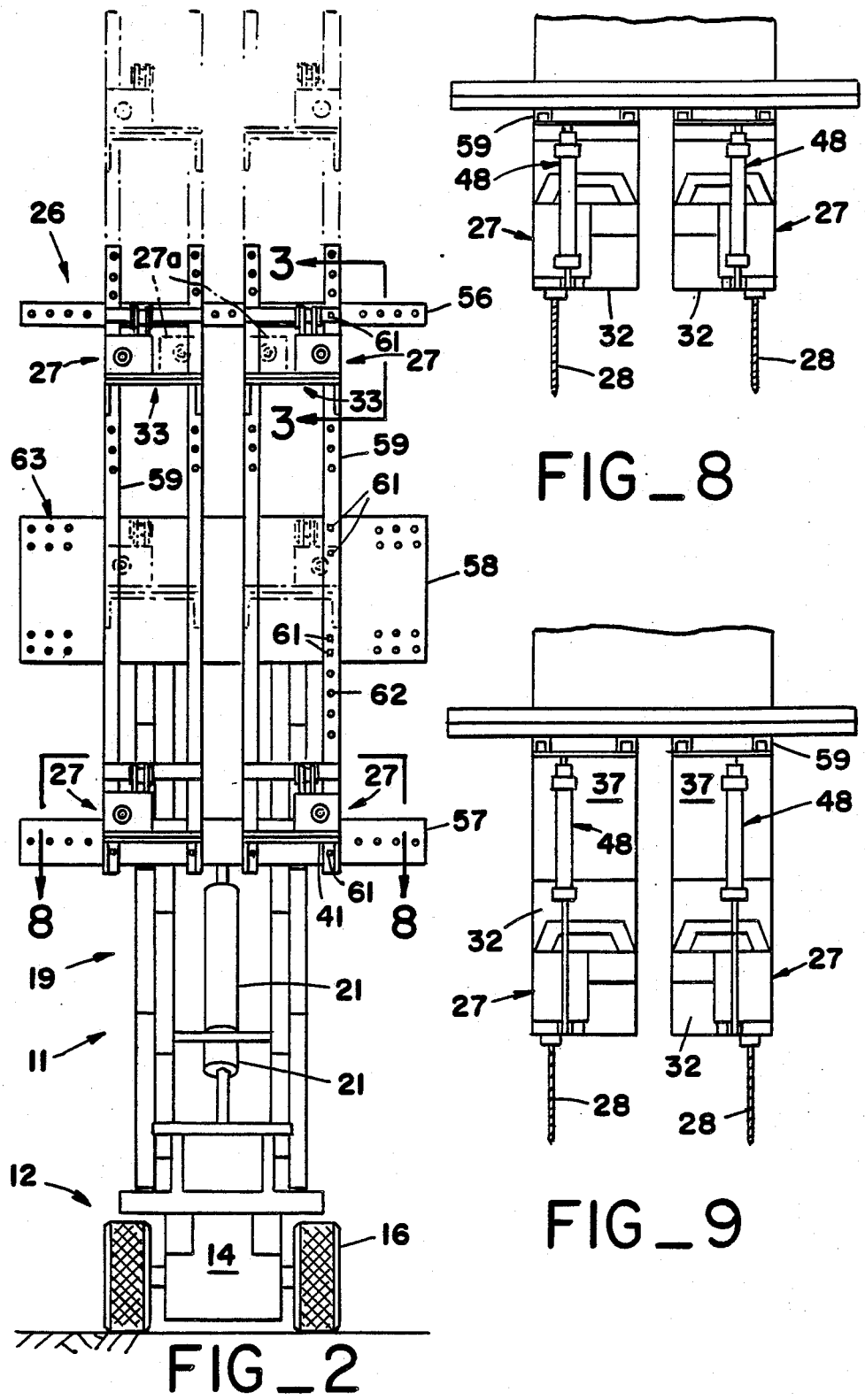

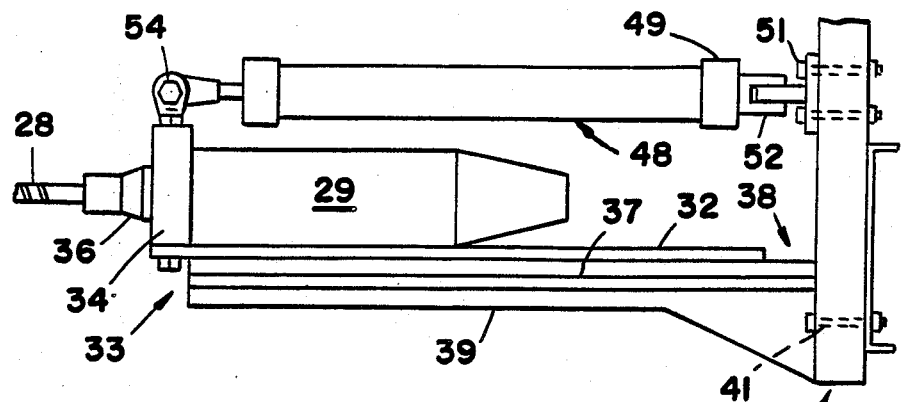
FIG_3
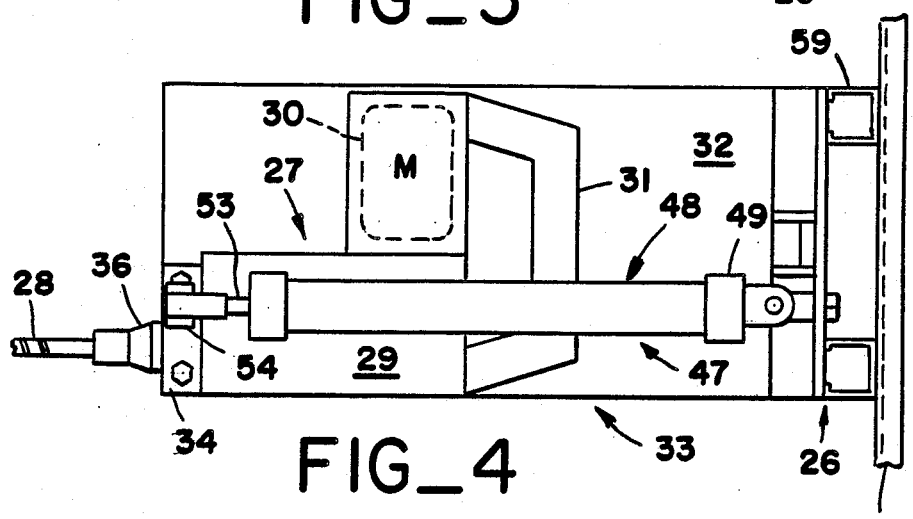
FIG_4
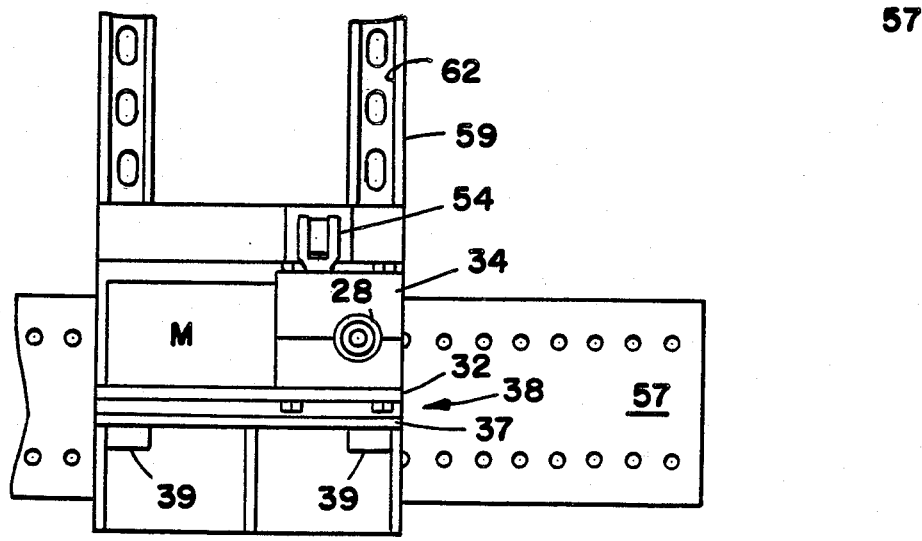
FIG_5

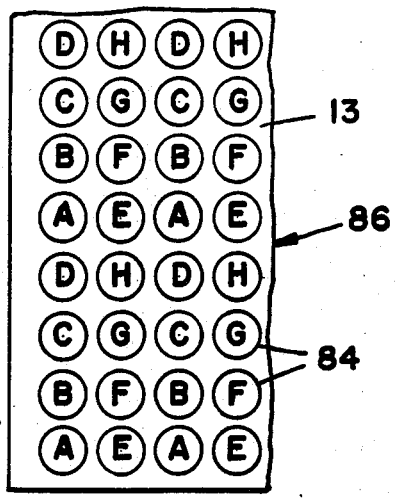
FIG_11
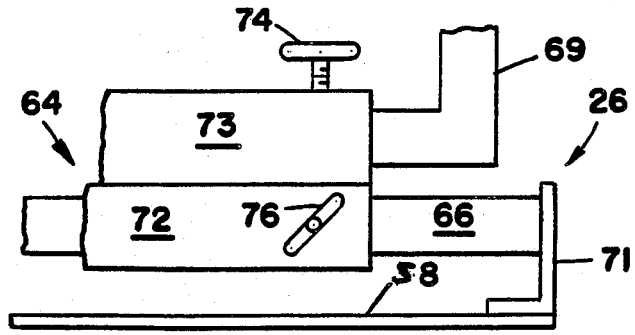
FIG_10
FIG_7
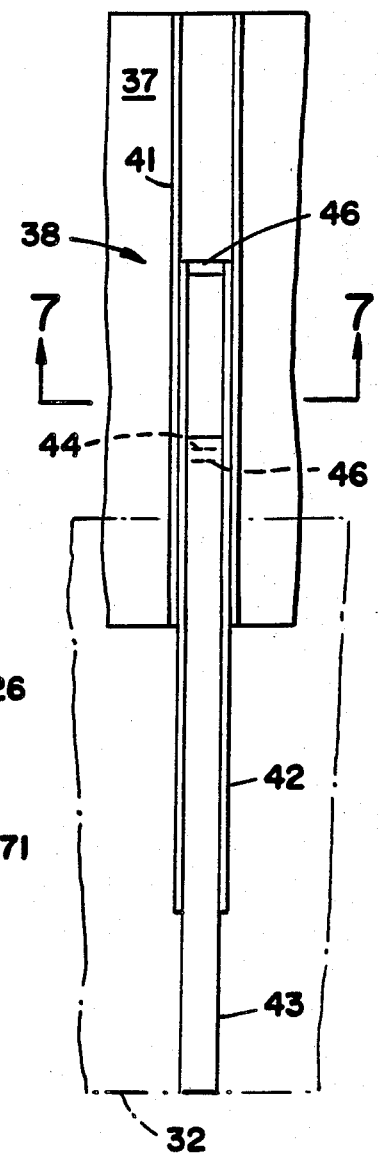
FIG_6

MULTIPLE BORE DRILLING APPARATUS

TECHNICAL FIELD

This invention relates to power driven apparatus for drilling a plurality of bores and more particularly to apparatus for drilling arrays of bores into vertical walls or the like.

BACKGROUND OF THE INVENTION

It is often necessary to drill an array of spaced apart bores into the walls of a building or the like for the purpose of fastening additional material to the wall. The additional material may variously be slabs, panels or slats of outer or interior facing material, poured concrete, shot crete or a number of other structural materials. The bores receive the bolts, studs, screws, reinforcing steel rods or the like which anchor the facinq material to the wall.

Manual drilling of such an array of bores on a one by one basis, using a hand held motorized drill, can be costly, time consuming and tedious particularly in connection with the construction or rehabilitation of sizable buildings. This procedure may also result in mislocated bores or bores that do not have a precisely uniform spacing that may be needed when preformed slabs with fixed anchors are to be fastened to the wall.

It would be advantageous if groups of such bores could be drilled concurrently and with a precisely fixed spacing with respect to each other. Drilling mechanisms have heretofore been devised which have a plurality of drill bits that operate simultaneously to drill plural passages but these do not have the characteristics that are needed for drilling arrays of bores in vertical surfaces such as a building wall.

Many such prior ganged drill mechanisms are fixed installations for use in factories and are adapted only for drilling into successive workpieces that must be traveled through the mechanism. Other mechanisms of this general type are designed for tunneling or mining and have arrays of projecting drills carried on apparatus which progresses along the route of the shaft. Drilling of arrays of bores in building walls requires a type of mobility and forms of adjustability in drill positions and spacing that are not provided by such prior mechanisms.

The present invention is directed to overcoming one or more of the problems discussed above.

SUMMARY OF THE INVENTION

In one aspect of this invention, apparatus for drilling a plurality of horizontal bores into vertical surfaces includes mobile support structure adapted for movement to successive locations along the vertical surface. A plurality of spaced apart drills are carried by the support structure and have parallel horizontally extending drill bits. First motor means operate the drills and second motor means provide for traveling the drills outward from the support structure and for retracting the drills. Third motor means enable joint movement of the drills in upward and downward directions.

In another aspect of the invention, the first motor means includes a first plurality of motors each of which operates a separate one of the drills. In another aspect, the second motor means includes a second plurality of motors each of which travels a separate one of the drills outward from the support structure. In still other aspects, the apparatus includes means for jointly shifting the drills sidewardly relative to the mobile support structure, means for selectively changing the horizontal spacing of the drills and means for selectively changing the vertical spacing of the drills.

In a further aspect of the invention, apparatus for drilling a plurality of rows of bores in a vertical wall or the like includes a mobile vehicle havinq a body and a platform and power driven means for selectively raising and lowering the platform relative to the body. A vertically oriented drill support frame is coupled to the platform for disposition in front of the wall or the like in substantially parallel relationship to the wall or the like. A plurality of extendible and retractable drill supports are secured to the support frame at horizontally and vertically spaced apart locations. Each of a plurality of motor driven drills is secured to a separate one of the the drill supports and the drills have parallel drill bits which extend outward from the drill supports. Each of a plurality of linear motors is connected between the drill support frame and a separate one of the drill supports to extend and retract the drill supports relative to the drill support frame. Control means enable selection of any of a plurality of modes of operation including concurrent operation of all drills, concurrent operation of a selected group of drills and independent operation of a single drill.

The invention enables drilling of arrays of bores in vertical walls or the like in a more economical and rapid manner, with high accuracy and provides safer and cleaner working conditions for the operator. The apparatus is maneuverable into successive positions along the wall at which it faces the wall and at each of which all or selected ones of an array of spaced apart drills can be advanced to drill bores simultaneously or in sequence. The drills may be jointly raised in steps at each such position to drill additional bores at progressively higher levels on the wall. In the preferred form of the invention, the horizontal and vertical spacing of the drills can be changed and the drills may be shifted sidewardly relative to the mobile support structure to assure that bores are formed at the desired locations on a wall. In the preferred form, each drill is driven by a separate motor and translated by a separate motor and thus variations in the resistance encountered by one drill do not affect the operation of the other drills.

BRIEF DESCRIPTION OF THE DRAWINGS

FIG. 1 is a side elevation view of a preferred embodiment of the apparatus for simultaneously drilling a plurality of bores in a wall or other vertical surface.

FIG. 2 is a front elevation view of the drilling apparatus of FIG. 1.

FIG. 3 is an enlarged side elevation view of a portion of the drilling apparatus of FIG. 1, taken along line 3—3 thereof, showing one of the drills and adjacent structure.

FIG. 4 is a plan view of the portion of the apparatus that is depicted in FIG. 3.

FIG. 5 is a front elevation view of the portion of the apparatus that is shown in FIGS. 3 and 4.

FIG. 6 is a fragmentary plan view of portions of the structure of FIGS. 3 to 5 illustrating the action of a telescopinq drill support rail which is a component of such structure.

FIG. 7 is a cross section view taken along line 7—7 of FIG. 6.

FIG. 8 is a plan view taken along line 8—8 of FIG. 2 further illustrating the telescoping drill support structure.

FIG. 9 is a view corresponding to FIG. 8 but showing the drill support structure in the extended condition.

FIG. 10 is a plan section view of a portion of the structure taken along line 10—10 of FIG. 1.

FIG. 11 is a diagramatic view illustrating the order in which successive groups of bores are drilled during one mode of operation of the apparatus.

DETAILED DESCRIPTION OF THE PREFERRED EMBODIMENT

Referring initially to FIG. 1 of the drawings, drilling apparatus 11 in accordance with this embodiment of the invention includes a mobile support structure 12 of a type that can easily be traveled to a work site and which can then be maneuvered between a series of positions at which it faces successive areas along a wall 13. The mobile support 12 preferably has a body 14 riding on ground engaging means such as wheels 16 and has a platform 17 which may selectively be raised and lowered relative to the body by motor means 18.

The mobile support 11 of this example is a self-propelled scissors lift of the known type in which platform 17 is coupled to body 14 by a pantograph linkage 19 with fluid cylinder motors 21 that enable selective extension and contraction of the linkage. The mobile support 12 may, if desired, be a vehicle of any of several other known types that enable selective elevation of a platform carrying an operator, fork lift trucks and man lifts being examples. A self propelled bucket loader of the type used in earth moving operations can, be adapted to serve as the mobile support structure 12 by replacing the bucket with a platform 17. The mobile support 12 may also be one which is maneuvered from position to position by a tractor or other means rather than being self-propelled.

Platform 17 is preferably provided with upwardly extending railinqs 22 at the front and both sides as an operator is carried on the platform during drilling operations. A pair of control consoles 23 and 24 are mounted on the front portion of railings 22 to enable operator Control of fluid and electrical motors as will hereinafter be described in more detail.

Referring to FIGS. 1 and 2 in conjunction, a vertically extending drill support framework 26 is coupled to the front of platform 17 and carries a plurality of motor driven drills 27 of which there are four in this example although the number of drills may be varied. Drills 27 have parallel, horizontally oriented drill bits 28 which extend forward from framework 26 and which may be traveled outward from the framework and then be retracted back towards the framework as will hereinafter be described in more detail. The drills 27 and bits 28 are of the rotary type in this example but drills and bits of the known impact type, for penetrating masonry walls, may also be used.

Referring jointly to FIGS. 3, 4 and 5, the drills 27 of this particular example of the invention are of the known form originally designed to be hand held by an operator and each of which has a body 29 containing a rotary electrical motor 30 which drives the bit 28 and each of which has a handle 31. Each such drill 27 is disposed on its side on the upper member 32 of a telescoping shelf assembly 33 and is secured to the shelf member 32 by a clamp 34 which engage the front end of the drill body 29 behind the drill chuck 36.

The shelf members 32 of the rail assemblies 33 are coupled to underlying lower shelf members 37 through telescoping rail mechanisms 38. Each lower shelf member 37 is secured to the drill support frame 26 by a pair of brackets 39 and bolts 41. Thus each shelf assembly 33 supports a separate one of the drills 27 and may be extended to travel the associated drill bit 28 outward from drill support frame 26 as drilling progresses.

Referring to FIGS. 6 and 7, the telescoping rail mechanisms 38 of this example each include three aligned rails 41, 42 and 43 arranged in telescoping relationship, each having a length somewhat greater than that of the shelf members 32 and 37 which are themselves of substantially equal length. The first rail 41 which clasps the second or intermediate rail 42 is secured to lower shelf member 37. The third rail 43 is clasped by the intermediate rail 42 and is secured to the upper shelf member 32. Catch elements 44 on the underside of the upper rail 43 engage catch elements 46 on the upper surface of the intermediate rail 42 to assure that the intermediate rail is partially extended from the lower rail 41 when the upper rail is more fully extended. This assures a high degree of strength when the rail mechanism 38 is at the maximum degree of extension.

With reference again to FIGS. 3, 4 and 5 in conjunction, motor means 47 are provided for concurrently or separately traveling the drills 27 outwardly from support frame 26 and for retracting the drills back toward the frame. For this purpose, in the present embodiment, a linear fluid motor or cylinder 48 is connected between drill support frame 26 and the drill clamp 34 above each of the drills 27. To provide for flexibility in such connections, the head end 49 of each such cylinder 48 is coupled to the frame 26 by bolts 51 and a pivot coupling 52 that has a vertical pivot axis and the extensible and retractable rod 53 of the cylinder is coupled to clamp 34 through another pivot coupling 54 having a horizontal pivot axis.

While the fluid motors or cylinders 48 may be of the hydraulic type, it is preferred to use pneumatic cylinders. Unlike hydraulic fluid, the compressed air within pneumatic cylinders is capable of further compression or expansion in response to variations in resistance encountered by the drill bits 28. This cushioning effect allows the rate of extension of each of the telescoping assemblies 33 to vary relative to that of the others in response to temporary variations of the resistance experienced by the drill bit 28 of the particular assembly 33 relative to the resistances encountered by the others. Each drill 27 can thereby adjust for variations in resistance and this helps in avoiding excessive bit wear, bit breakage, motor overheating and other problems that can arise from an overly rapid drilling rate.

Thus cylinders 48 may be jointly actuated to advance the drills 27, concurrently, from the retracted position shown in FIG. 8 to the extended position depicted in FIG. 9 and the cylinders may then be reversed to withdraw the drills back to the retracted position.

Referring again to FIGS. 1 and 2, the four telescoping drill supports 33 of this embodiment are each located at a different corner region of the drill support frame 26 to in effect define a lower row of two drills 27 and an upper row of two drills. Each such row may contain a larger number of drills 27 and additional horizontal rows of drills may be provided. Where the drilling apparatus 11 is designed for use at different types of building, it is desirable to provide for selective changing of both the horizontal and vertical spacing of the drills 27 as the desired spacing of the bores in walls 13 may vary from site to site.

For the foregoing purpose, the drill support frame 26 of this embodiment is formed in part by upper and lower cross members 56 and 57 respectively and a plate-like intermediate cross member 58 situated at an elevation between that of members 56 and 57. Four parallel, spaced apart upright members 59 are fastened to the forward faces of each of cross members 56, 57, 58 by dis-enqagable bolts 61. The support brackets 39 of each of the telescoping drill supports 33 are fastened to a pair of the upright member 59 by the previously described bolts 41.

Each of the upright members 59 has a series of vertically spaced apertures 62 for receiving the bolts 41 and thus the vertical position of any of the drills 27 may be changed by disengaging the bolts 41 which support that drill, moving the telescoping shelf 33 of that drill upward or downward and reengaging engaging the bolts 41 in others of the apertures 62.

Similarly, each of the cross members 56, 57 and 58 has one or more horizontal rows of apertures 63 for receiving the bolts 61 that attach the upright members 59 to the cross members. Thus the horizontal spacing of the drills 27 may be adjusted by disengaging bolts 61, shifting each pair of upright members 59 closer together or further apart and then re-engaging the bolts 61 in others of the apertures 63.

In instances which require a smaller horizontal spacing of the drills 27 than is permitted by the particular arranqement shown in FIG. 2, the right and left shelf assemblies 33 may be interchanged to locate the drills 27 at the adjacent sides of the assemblies as depicted by dashed lines 27a in the drawing.

In many cases, the bores which are to be drilled in a wall 13 must have a predetermined location relative to the boundaries of the wall as well as to each other. This requires that the drill support frame 26 be adjusted to a particular position relative to the wall. Adjustment of the vertical position of the drill support frame 26 can be accomplished by operation of the scissor lift platform elevating motors 21. Any sideward canting of the support frame 26 within the plane of the frame due to an unlevel ground surface adjacent the wall 13 can be corrected by excavating or building up the surface or by placing shimming under the wheels 16 of the scissors lift.

Lateral positioning of the support frame 26 is accomplished primarily by maneuvering the scissor lift 12 to the appropriate location along the wall but this may require an undesirable amount of effort to bring the drill bits 28 into the precise locations along the wall where the bores are to be drilled. This is voided by coupling the drill support frame 26 to platform 17 through attachment means 64 which enables some side shifting of the frame 26 relative to the platform. The attachment means 64 also enables forward and backward tilting of the frame 26 relative to the platform 17 to correct any undesired lack of parallelism between the frame and wall 13.

In particular, with reference jointly to FIGS. 1 and 10, a tube 66 of circular cross section extends in parallel relationship with the intermediate cross member 58 of the drill support frame 26 between the support frame and the member 69 which forms the forward cross brace of platform 17. Tube 66 is secured to the back of cross member 58 at each end of the tube by a bracket 71. Tube 66 extends through a relatively short sleeve 72 and the sleeve is welded to a member 73 of inverted U-shaped cross section which fits on to the platform cross brace 69. Large set screws 74 ar threaded into member 73 to secure the drill support frame 26 to the platform 17.

As tube 66 may be rotated relative to the coaxial sleeve 72 and may also be slid longitudinally relative to the sleeve, drill support frame 26 may be tilted forward and backward and shifted sidewardly relative to platform 17 to accomplish the adjustments discussed above. Additional large set screws 76 are threaded into sleeve 72 to exert pressure against tube 66 when the desired adjustment has been made and to thereby lock the support frame 26 into the desired position and location.

With reference to FIG. 1 in particular, the drill support frame 26 is further supported by a pair of turnbuckles 77 connected between opposite ends of the upper cross member 56 and the corresponding side railing 22 of platform 17, only one of the turnbuckles being visible in the figure. The fastenings which couple the turnbuckles 77 to both cross member 56 and side railings 22 are swivel connectors 78.

Turnbuckles 77 are of the known type which may be extended or contracted by manual rotation of one end relative to the other. Thus the lengths of the turnbuckles 77 may be changed as necessary to accommodate to the above described sideward movement and/or tilting of the drill support frame 26 relative to platform 17. This is more conveniently accomplished if the swivel connectors 78 are of a type which can be temporarily disconnected from side railings 22.

Electrical power for operating the drills 27 is frequently available from utility lines at the work site or a motor-generator set can be used where that is not the case. A portable motor driven air compressor (not shown ma be used to provide compressed air for operating the pneumatic cylinders 48. The body of the scissors lift 12 carries a motor driven pump 79 which supplies pressurized hydraulic fluid for operating the lift motors 21. Four switches 81 are mounted on control console 23 each of which enables actuation and deactuation of a separate one of the drills 17. An additional series of pneumatic cylinder control switches 82 enable individual or joint extension and retraction of each of the cylinders 48. A control valve 83 of conventional construction is situated on the other console 24 and enables operator control of the lift motors 21.

In operation, the horizontal and vertical spacings of the drills 27 on support frame 26 are adjusted in the manner previously described to conform with the desired spacing of the bores which are to be drilled in wall 13. The mobile support 12 is then maneuvered into a position at which the support frame 26 faces the area of wall 13 at which the array of bores are to be drilled. Lift motors 21 are actuated to bring the drill bits 28 to the exact elevations at which bores are to be drilled. If necessary, the support frame 26 may then be shifted sidewardly and tilted forward or backward in the manner previously described to register the drill bits 28 with the exact locations where bores are to be drilled and to bring the drill bits into an exact horizontal or other desired alignment.

All or one or more selected ones of the drills 27 are then turned on by closing the appropriate ones of control switches 81. The operator then closes all or selected ones of switches 82 to cause pneumatic cylinders 48 to advance the actuated drills 27 and drill bits 28. Following drilling to the desired depth in wall 13, the operator operates switches 82 to retract the drills 27 from wall 13. Lift motors 21 are then operated to raise the drills 27 to a higher level and the sequence of operations is repeated to drill additional rows and/or columns of bores in the wall 13 unless the original bores are all that is needed at the particular area of the wall. Following drill-of the complete array of bores at the particular area of wall 13, the drilling apparatus 11 may be repositioned at an adjoining area along the wall and a similar sequence of operations may be performed.

The vertical spacing and/or the horizontal spacing of the drills 27 on support frame 26 may be greater, by some integral multiple, than the vertical and horzontal spacings of the bores which are to be drilled. Successive drilling operations at a given area of the wall 13 may then be conducted in the manner diaqramed in FIG. 11 which by lettered circles indicates the order of drilling of bores 84 of an array of bores 86. In particular, the initial drilling operation in this example produces the lower left bore, the lowermost bore in the third vertical column of bores and the fifth bore up in both the left column and the third column, eaCh of which bores are designated by the letter A in FIG. 11.

The drill support frame is then raised a distance equal to the desired vertical spacing of adjacent bores of the array 86 and another drilling operation is conducted. This results in simultaneous drilling of the four separated bores designated by letter B in FIG. 11. Additional drilling operations following successive similar raisings of the drills produce the bores designated by letters C and D. The drill support frame is then shifted sidewardly a distance equal to the desired horizontal spacing of the bores 84 and successive drilling operations, separated by raising of the drill support, successively produces the bores designated by letters E, F, G and H. The drilling apparatus 11 may be periodically repositioned at successive locations along the wall 13 when the horizontal extent of the array 86 of bores 84 exceeds the limit of sideward adjustment of the support frame 26 relative to the mobile support 19 of the apparatus 11.

While the invention has been disclosed with respect to a single specific embodiment for purposes of example, many variations and modifications of the construction are possible and it is not intended to limit the invention except as defined in the following claims.

I claim:

1. Apparatus for drilling a plurality of horizontal bores into a substantially vertical building wall or the like comprising:
    a mobile vehicle having ground engaging means and being adapted for travel towards said wall or the like and away from the said wall or the like and for movement to successive locations along said wall or the like,
    a vertically extending frame carried at the forward end of said vehicle and which faces in the direction of forward travel of said vehicle,
    means for enabling selective raising and lowering of said frame relative to said vehicle,
    a plurality of drill supports secured to said frame and extending forwardly therefrom, said drill supports being individually extendible and contractible,
    a plurality of spaced apart drills each being secured to a separate one of said drill supports, said drills having parallel horizontally extending drill bits which extend forward from said drill supports at a region which is above and in front of said vehicle, said drills further having a first plurality of motors each of which drives an individual one of said drills, and
    a second plurality of motors each being connected to extend and contract a separate one of said drill supports.

2. The apparatus of claim 1 further including means for shifting said frame including said plurality of drills sidewardly relative to said mobile vehicle.

3. The apparatus of claim 1 wherein said plurality of drill supports each carrying one of said drills and drill bits include at least a first group of drill supports and a second group of drill supports that are situated above said first group thereof in vertically spaced apart relationship therewith, further including means for selectively changing the horizontal spacing of said drill supports of both said first and second groups thereof and means for selectively changing the vertical spacing of said groups of drill supports.

4. The apparatus of claim 1 adapted for drilling a plurality of vertically spaced horizontal rows of said bores in said building wall or the like each of which rows is spaced above the subjacent row by a predetermined fixed distance, wherein said drills and drill supports include a first horizontal row thereof and at least a second horizontal row thereof which is situated above said first row by a distance which is an integral multiple of said predetermined fixed distance whereby said frame may be repetitively raised in steps corresponding to said predetermined fixed distance and operated to simultaneously drill bores of one row thereof and another row thereof that is separated from said one row by others of said rows.

5. Apparatus for drilling a plurality of horizontal bores into vertical surfaces comprising:
    a mobile support structure adapted for movement to successive locations along said vertical surface wherein said mobile support is a vehicle having a body which rides on ground engaging means,
    a plurality of spaced apart drills carried by said support structure and having parallel horizontally extending drill bits,
    first motor means for operating said drills,
    second motor means for traveling said drills outward from said support structure and for concurrently retracting said drills back towards said support structure,
    third motor means for jointly moving said drills in upward and downward directions,
    a drill support frame having said plurality of drills mounted thereon, and means for enabling selective raising and lowering of said drill support frame relative to said vehicle body,
    a plurality of horizontally extendible and contractible drill supports secured to said drill support frame and each having a separate one of said drills secured thereto, and wherein said second motor means enables progressive extension and contraction of said drill supports relative to said frame,
    and wherein said second motor means includes a plurality of extendible and contractable pneumatic cylinders each being coupled between said drill support frame and a separate one of said drill supports, and control means for enabling a plurality of modes of operation which include concurrent actuation of each of said drills and pneumatic cylinders, concurrent actuation of a selected portion of said drills and cylinders and actuation of a selected one of said drills and a selected one of said cylinders.

6. Apparatus for drilling a plurality of rows of bores in a vertical wall or the like, comprising:

a mobile vehicle having a body and a platform and power driven means for selectively raising and lowering said platform relative to said body, a vertically oriented drill support frame coupled to said platform for disposition in front of said wall or the like in substantially parallel relationship therewith, a plurality of extendible and retractable drill supports secured to said support frame at horizontally and vertically spaced apart locations thereon, a plurality of motor driven drills, each being secured to a separate one of said drill supports and having parallel drill bits which extend outward from said drill supports, a plurality of linear motors each being connected between said drill support frame and a separate one of said drill supports to extend and retract said drill supports relative to said drill support frame, and control means for enabling selection of any of a plurality of modes of operation which include concurrent operation of all drills, concurrent operation of a selected group of drills and independent operation of a single drill.

7. The apparatus of claim 6 further including means for selectively changing the horizontal spacing and the vertical spacing of said drill supports relative to said drill support frame, and means for selectively shifting said drill support frame sidewardly relative to said platform.

8. The apparatus of claim 6 further including means for selectively pivoting said drill support frame forward and backward relative to said platform.

* * * * *